Jan. 12, 1932.   E. L. KIRTLEY   1,841,248
TIRE ALARM
Filed Jan. 7, 1931
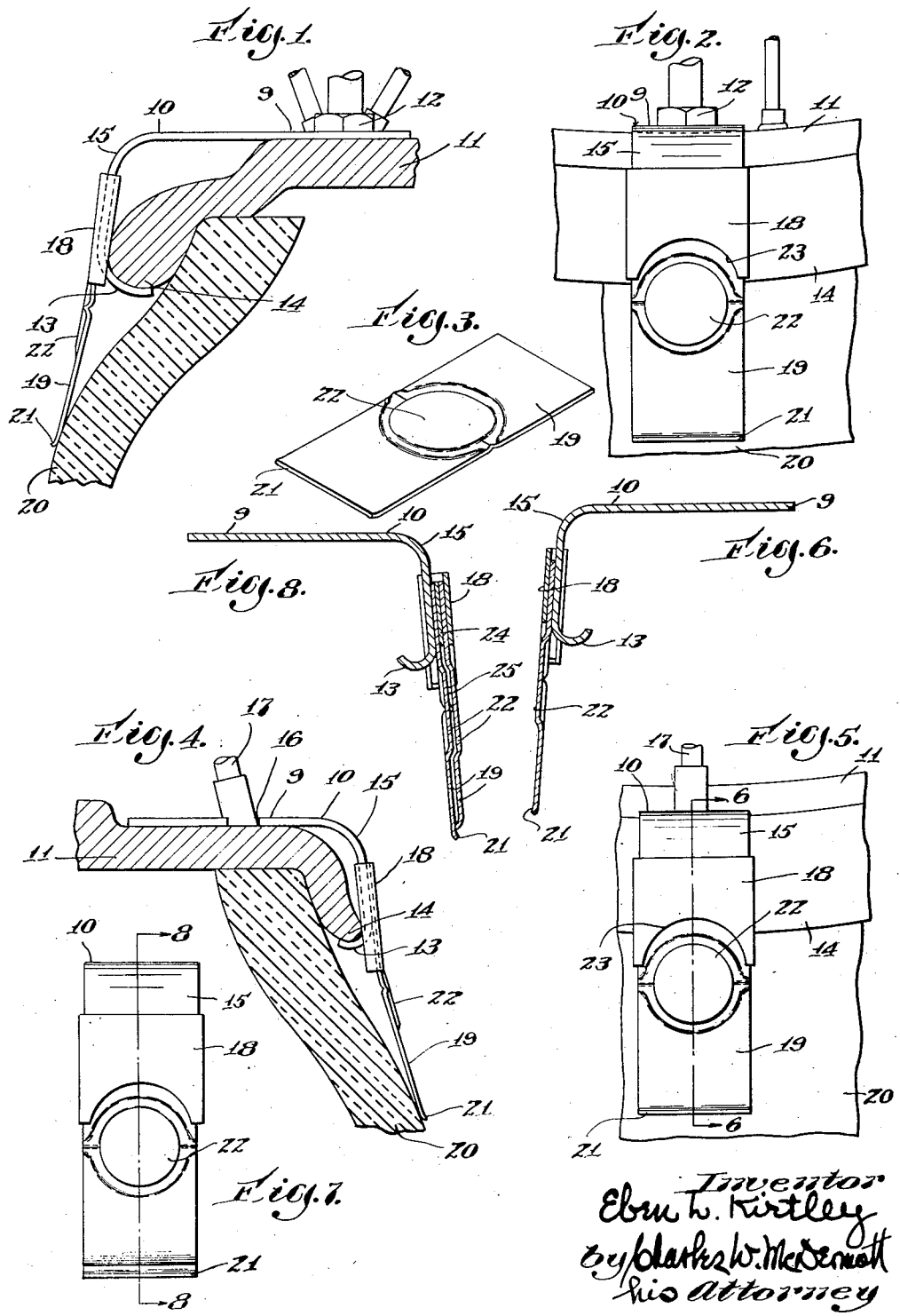
Inventor
Eben L. Kirtley
by Clarke W. McDermott
his Attorney Patented Jan. 12, 1932

1,841,248

UNITED STATES PATENT OFFICE

EBEN L. KIRTLEY, OF WATERTOWN, MASSACHUSETTS

TIRE ALARM

Application filed January 7, 1931. Serial No. 507,146.

The present invention relates to signals and more particularly to alarms which are sounded on automobiles during their operation to warn the operator of a deflating tire in order that it may receive attention in time to save the tube therein from ruin.

The principal object of the present invention is to produce an efficient tire alarm which can be manufactured economically, which will require neither skill nor judgment on the part of the user in applying it to a car and which will require thereafter a minimum of attention.

To the accomplishment of this object, and such others as may appear hereinafter, the various features of the present invention reside in certain devices, combinations and arrangements of parts hereinafter described and then set forth broadly and in detail in the appended claims which possess advantages readily apparent to those skilled in the art.

The various features of the present invention will be readily understood from an inspection of the accompanying drawings illustrating the best forms of the invention at present known to the inventor, in which, Figure 1 is a view in side elevation of the tire alarm shown applied to a wheel of the wire spoke type used on Fords;

Fig. 2 is a view in front elevation of the tire alarm illustrated in Fig. 1;

Fig. 3 is a view in perspective of the sound producing strip;

Fig. 4 is a view in side elevation of the tire alarm shown applied to a wheel of the wire spoke type used on Hupmobiles;

Fig. 5 is a view in side elevation of the tire alarm illustrated in Fig. 4;

Fig. 6 is a sectional elevation on the line 6—6, Fig. 5;

Fig. 7 is a view in front elevation of a modification, and

Fig. 8 is a sectional elevation on the line 8—8, Fig. 7.

In the embodiment of the invention illustrated in Figs. 1 and 2, one arm 9 of a yoke 10 is secured to the inside peripheral surface of the wheel 11 by the nut 12 of the usual air valve casing. It will be understood that the arm 9 is provided with a circular opening to receive the air valve casing and that the nut 12 clamps the arm 9 to the wheel 11. The other arm of the yoke 10 is bent to form a hook 13 which is hooked under the flange 14 of the rim. As shown in the drawings, the rim is integral with the wheel as is usual with wheels of the wire spoke type. The tire alarm embodying the features of the present invention may be attached to wheels of the wood spoke type in which the rim is usually not integral with the wheel. It is to be understood, therefore, that the terms "wheel" and "rim" employed herein in disclosing the invention are applicable to all wheels of the pneumatic tire type whether or not the wheel and the rim are integral.

Intermediate the arms 9 and 13 the yoke 10 is provided with a bend 15. The yoke 10 comprises a strip of some stiff metal capable of retaining the shape in which it is formed. The shape of the yoke 10 depends upon the type of wheel with which it is used. The tire alarm illustrated in Figs. 1 and 2 is adapted to engage the wheel and rim of the wire spoke type used on Fords. The tire alarm illustrated in Figs. 4 and 5 is adapted to engage the wheel and rim of the wire spoke type used on Hupmobiles. By changing slightly the shape of the yoke 10 in the process of manufacture it may be formed to grip the wheel and rim of any wheel of the pneumatic tire type. In any case, the yoke 10 presents a rigid support for the sound producing device. The yoke 10 is attachable readily to the wheel and requires no attention thereafter.

As shown particularly in Fig. 4 the arm 9 of the yoke 10 may be provided with a lateral slot 16 to enable the arm 9 to be hooked into engagement with one of the wire spokes, 17. The arms 9 and 13 of the tire alarm illustrated in Fig. 4 engage the wheel and the rim, respectively, in the same manner as the arms 9 and 13 in the tire alarm illustrated in Figs. 1 and 2.

Adjacent the hook 13 the yoke 10 is provided with a clamp 18 which houses the upper end of a flexible strip of steel 19 and secures it in position against the back face of the yoke. The lower end of the flexible strip 19 is positioned closely adjacent, or, it may be, in contact with the tire 20. To allow contact with the tire 20 without damage thereto during normal operation the lower end of the flexible strip 19 may be bent slightly as at 21.

Intermediate the free end of the strip 19 and the clamp 18 the strip is provided with an embossed disk 22. As shown in Figs. 2, 5 and 8 the lower edge of the clamp 18 is provided with a semi-circular cut-out 23 substantially surrounding the upper half of the disk 22. This construction permits the front face of the clamp 18 to hold the strip 19 close to the disk 22 without, however, interfering with the noise producing function thereof.

When the tire commences to deflate the lower end of the strip 19 is flexed laterally by the tire which causes the disk 22 to click. During the rotation of the wheel the strip is flexed laterally when it is nearest the ground and it is flexed back into its normal position when it is farthest from the ground, thus producing a click-clack sound at each revolution of the wheel and thereby sounding an alarm indicating the lowering of the tire pressure.

Figs. 5 and 7 illustrate a modification whereby the clamp 18 houses the upper ends of two flexible strips 19 both of which are provided with the noise producing disks 22. Interposed between the upper ends of the two strips 19 is a spacing strip 24 which maintains a spaced relation between the two disks 22. Providing the tire alarm with two noise producing disks 22 separated by an air space 25 amplifies the click-clack sound greatly.

Nothing herein explained is to be interpreted as limiting the invention in the scope of its application to use in connection with the particular apparatus or the particular mode of operation or both selected for purposes of illustration and explanation. While the particulars of construction herein set forth are well suited to the various forms of the invention, it is not limited to these details of construction, nor to the conjoint use of all its features, nor is it to be understood that these particulars are essential since they may be modified within the skill of the artisan without departing from the true scope of the actual inventions, characterizing features of which are set forth in the following claims by the intentional use of generic terms and expressions inclusive of various modifications.

What is claimed as new is:

1. In a tire alarm, the combination with a sound producing device, of a support therefor comprising an arm engaged with the internal periphery of the wheel and an arm engaged with the external periphery of the rim.

2. In a tire alarm, the combination with a sound producing device, of a support therefor comprising a yoke having arms embracing the wheel and the rim.

3. In a tire alarm, the combination with a support having an arm engaged with the wheel and an arm engaged with the rim, of a sound producing device carried by the support in position to be actuated by a deflating tire.

4. In a tire alarm, the combination with a yoke having an arm engaged with the wheel, an arm engaged with the rim and at least one bend intermediate the arms, of a flexible sound producing strip having one end secured to the yoke and having its other end in position to be flexed by a deflating tire.

5. In a tire alarm, the combination with a yoke having an arm engaged with the wheel and an arm provided with a hook for hooking under the flange on the rim, of a flexible sound producing strip having an end secured to the yoke and a free end positioned to be flexed by a deflating tire.

6. In a tire alarm, the combination with a plurality of sound producing devices separated by an air space, of a support therefor comprising a yoke having arms embracing the wheel and the rim.

7. In a tire alarm the combination with a strip of steel provided with an embossed disk and a support comprising a yoke having arms embracing the wheel and the rim, of a clamp for securing the upper end of the strip to the back face of the yoke having a cut-out substantially surrounding the upper half of the disk.

In testimony whereof I have signed my name to this specification.

EBEN L. KIRTLEY.